United States Patent [19]
Takimoto

[11] Patent Number: 4,744,457
[45] Date of Patent: May 17, 1988

[54] METHOD AND DEVICE FOR COLLECTING COMMODITIES

[75] Inventor: Hiroaki Takimoto, Kyoto, Japan

[73] Assignee: Tetra Pak International Aktiebolga, Lund, Sweden

[21] Appl. No.: 48,970

[22] Filed: May 4, 1987

Related U.S. Application Data

[63] Continuation of Ser. No. 771,209, Aug. 30, 1985, abandoned.

[30] Foreign Application Priority Data

Sep. 3, 1984 [JP] Japan .................. 59-185265

[51] Int. Cl.$^4$ ............................................. B65G 47/26
[52] U.S. Cl. ...................................... 198/426; 198/434; 414/59; 414/68; 53/543
[58] Field of Search ............... 198/419, 426, 427, 429, 198/434; 414/59, 63, 68; 53/537, 543

[56] References Cited

U.S. PATENT DOCUMENTS

| | | | |
|---|---|---|---|
| 2,090,129 | 8/1937 | Kimball et al. ............. | 198/427 |
| 3,068,624 | 12/1962 | Linda ..................... | 53/531 X |
| 3,923,144 | 12/1975 | Langen .................... | 198/429 |
| 4,638,903 | 1/1987 | Kimura .................. | 198/426 X |

FOREIGN PATENT DOCUMENTS

| | | | |
|---|---|---|---|
| 60-178125 | 9/1985 | Japan . | |
| 7712083 | 7/1979 | Sweden .................. | 414/59 |
| 461546 | 2/1937 | United Kingdom ........ | 198/429 |

Primary Examiner—Joseph E. Valenza
Assistant Examiner—Jonathan D. Holmes
Attorney, Agent, or Firm—Koda and Androlia

[57] ABSTRACT

A method for collecting commodities in a group, a longitudinal series of commodities being fed set by set into a tapered pusher on which stages having enough size to accommodate square commodities are continuously formed, a pusher advancing a length equal to one commodity so that the commodity group is pushed out in such a condition that the contacting surfaces of the commodities in the row disagree with the contacting surfaces of the commodities in the adjacent rows. A device for collecting commodities uses a tapered pusher on which stages having a longitudinal length shorter than a length of a square commodity and a substantially same lateral length as a width of the square commodity are continuously formed, the pusher being disposed on an operation table provided at a side of a conveyor for conveying commodities to move in a longitudinal direction parallel to the conveyor.

1 Claim, 5 Drawing Sheets

METHOD AND DEVICE FOR COLLECTING COMMODITIES

This is a continuation of application Ser. No. 771,209, filed Aug. 30, 1985, now abandoned.

BACKGROUND OF THE INVENTION

1. Field of the Invention

The present invention relates to a method and a device for collecting a plurality of square commodities such as square cylindrical paper containers for milk and juice into a group.

2. Prior Art

In order to collect a plurality of square commodities into a group to pack or wrap them, such a method has been employed that the commodities conveyed by a conveyor are individually pushed out sideways by a pusher. However, this method is inefficient because only one commodity is handled by one operation of the pusher.

Further, during collecting and packing of the commodities it is sometimes desired to be change the packing pattern so that five commodities, for example, may form one set or two rows containing five commodities each may be formed. However, the above described method cannot fully satisfy the above requirements.

As a means to overcome the above disadvantages, there is a device shown in Japanese Patent Application No. 59-0350079 wherein a tapered or inclined pusher is employed. The pusher is provided with continuous stages. Each of the stages longitudinally and laterally has substantially the said dimensions with respect to the length and width of a square commodity. Commodity groups in which the commodities are longitudinally adjacent to each other and form rows are loaded into a pusher set by set so that the pusher is then moved forward a length corresponding to one commodity after each loading.

The above device overcomes the above described disadvantages; however, on the other hand, it has the following disadvantage. When the pusher is forwarded, the corner of a commodity may catch on the adjacent commodity thus crashing into one of many square commodities. The row of commodities is thus disordered and the collecting operation is disrupted.

SUMMARY OF THE INVENTION

It is a primary object of the present invention to provide a method and device in which a plurality of square commodities are collected into one group by utilizing a pusher, preventing the problems mentioned in the prior art from occurring when the pusher is operating.

The method is characterized in that the commodity group is pushed out such that the contacting surfaces of the longitudinally adjacent commodities in a row shift forwardly or rearwardly with the contacting surfaces of the longitudinally adjacent commodities in the other adjacent row.

The device is characterized in that a tapered pusher, on which stages having a longitudinal length shorter than the length of a square commodity and substantially the same lateral length as the width of the square commodity are continuously formed, is disposed on an operation table provided at a side of a conveyor for conveying the commodities and is slidable in a longitudinal direction parallel to the conveyor.

As described above, in the present invention the pusher is tapered and is provided with continuous stages large enough in size to accommodate the commodities, and the commodities are pushed out by the pusher such that the contacting surfaces of the adjacent commodities in one row are shifted forwardly or rearwardly with respect to the contacting surfaces of the longitudinally adjacent commodities in the other adjacent row. Thus, when the pusher operates, the corners of the adjacent commodities are always shifted forwardly or rearwardly with respect to each other so that the side surfaces of the commodities in the row function as a kind of guide for the commodities in the adjacent row which is being pushed out by the pusher.

Further, the tapered pusher, on which stages having a longitudinal length shorter than the length of the square commodity are continuously formed, is disposed on an operation table provided at the side of the conveyor for conveying the commodities so that the pusher is slidable in the longitudinal direction parallel to the conveyor. Thus, the commodity groups form rows wherein each of the commodities are longitudinally adjacent to each other and are loaded set by set to the pusher. When the pusher is moved a length corresponding to one commodity in accordance with each above operation, the adjacent commodities among the commodities loaded in the stages and the forward position thereof are forwardly or rearwardly shifted at the corners and pushed out with this shifted condition.

BRIEF DESCRIPTION OF THE DRAWINGS

The accompanying drawings illustrate an embodiment of the invention, wherein.

DETAILED DESCRIPTION OF THE INVENTION

Figure 1:
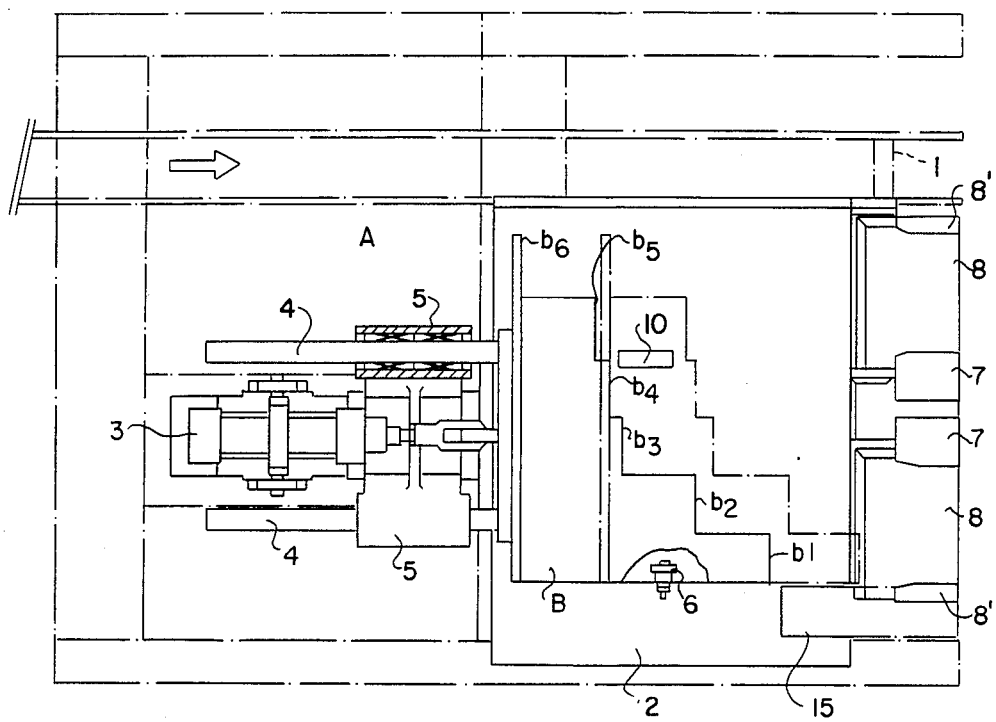
FIG. 1 is a plan view illustrating a whole collecting device for commodities.
Figure 2:
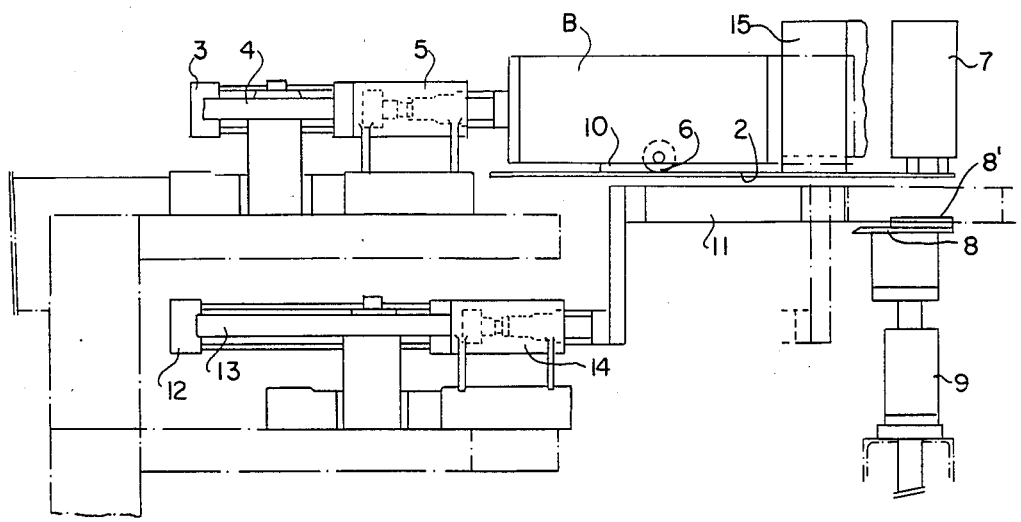
FIG. 2 is a vertical view thereof.

FIGS. 1 and 2 illustrate the entire device of the embodiment in which respectively two commodities are laterally aligned at the left and right with a space corresponding to the two commodities therebetween when the commodities are collected into groups.

Referring to FIG. 1, A indicates a conveyor for conveying commodities, which is continuously driven in the direction of the arrow. A stopper 1 is provided at the forward end of the conveyor A so that the commodities successively delivered are stopped there.

A flat operation table 2 is provided at the side of the conveyor A. A pusher B driven by a cylinder 3 to slide parallel to the conveyor A is provided on the operation table 2.

Figure 3:
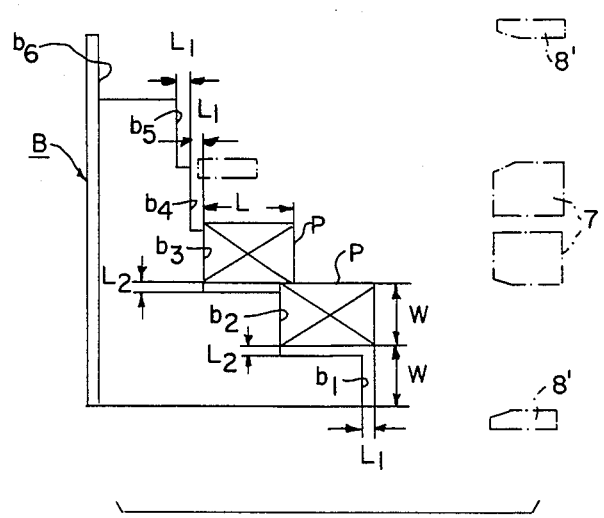
FIG. 3 is an enlarged plan view of only a pusher for collecting commodities.

As illustrated in FIG. 3 in detail, the pusher B is substantially tapered and is provided with continuous recesses or stages b1 to b6. Each stage has a smaller longitudinal size than a length L of the square commodity P to be handled and has substantially the same lateral size as the width W of the commodity P. For example, in FIG. 3, the longitudinal length of the stages b1, b2 and b3 are shorter by the lengths L1 than the length L of the commodity P, respectively. The longitudinal length of the stages b4 and b5 are further shorter than the stages b1, b2 and b3. That is, the longitudinal lengths of the stages b4 and b5 are the same as the length L1, respectively. While the width of the stages b2 to b6 are the same as the width of the commodity P respectively, the width of the stage b1 is shorter by the length L2 than the width W of the commodity P.

The pusher B is further provided with two laterally spaced rods 4 extending rearwardly. Both rods 4 are adapted to slide in guide tubes 5 which are positioned at the left and right sides of a cylinder 3 when the pusher B is operated by the cylinder 3. Rollers 6 to roll on the operation table 2 are disposed on the lower surface of the pusher B. By means of the rods 4 inserted into the tubes 5 and the rollers 6 provided under the pusher B, the relatively large pusher B is able to longitudinally slide smoothly without being inclined.

Standing stoppers 7 are disposed at the middle portion of the forward end of the operation table 2, i.e. in front of the stages b3 and b4 of the pusher B. Disposed outside of both of the stoppers 7 are storage bases 8 which can move vertically between a height level with the operation table 2 and lower than it. The vertical movements of the left and right storage bases 8 are performed individually by two vertical cylinders 9. Vertical guide plates 8' are disposed outside of the two storage bases 8.

Further, a stopper 10 is fixed at the position shown in FIG. 1 on the upper surface of the operation table 2. The height of the stopper 10 is determined such that the bottom of the pusher B may pass over the stopper. Thus, the stopper 10 is prevented from being an obstacle to the pusher B.

On the other hand, as shown in FIG. 2, two pushers 11 are disposed for each one of the two storage bases 8, respectively. The pushers 11 longitudinally move between the operation table 2 and the storage bases 8 when the storage bases 8 go down to the lowermost positions. The right and left pushers 11 slide longitudinally (to the right and left in FIG. 2) by the cylinders 12 which are individually arranged at the left and right. The cylinders 12 slide the pushers 11 from the position shown by a solid line to the position shown by an alternate long and short dashed lines in FIG. 2.

Each pusher 11, similar to the pusher B, is also provided with a rod 13 which extends rearwardly to slide in the guide tube 14 disposed at the side of the cylinder 12 when the pusher 11 operates.

In the drawing, numeral 15 (in FIGS. 1, 2 and 4(a)-4(d)) indicates a stopper disposed at the side of the pusher B on the operation table 2 and on the downstream side of the guide plate 8'. The inside surface of the stopper 15 is substantially on the same line as the outside surface of the pusher B. Specifically, a small space is left between the pusher B and the stopper 15.

Collecting operations by the device shown in FIG. 1 will be described in detail below.

Figure 4A:
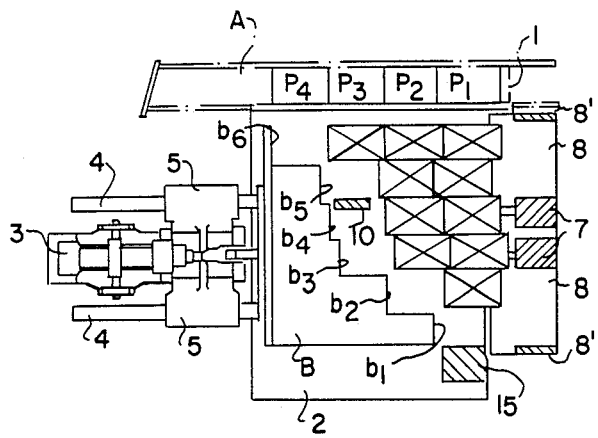
FIGS. 4(a) through 4(d) are plan views illustrating the collecting conditions, in accordance with the processes, in which respectively two commodities transversely aligned at the left and right with a space corresponding to two commodities therebetween are divided and collected into groups.

Through one cycle of the processes shown in FIGS. 4(a)-4(d), the device divides the commodities into two groups respectively including two laterally aligned commodities with a space the same size as two the commodities. Namely, as shown in FIG. 4(a), one commodity is placed in front of the second stage b2 of the pusher, two are placed in front of the third, fourth and fifth stages b3, b4 and b5, and three are placed in front of the last stage b6. Thus, in total ten commodities are previously placed in the appropriate positions with spaces left between the commodities and the front edges of the stages b1 to b6. The end surfaces of the commodities at the left end may lie in the same plane as the left end surface of the pusher B.

As stated before, the longitudinal length of the stages b1 to b6 in the pusher B are respectively shorter by the length L1 (see FIG. 3) than the length L of the commodity to be handled. Therefore, the commodities in front of the stages b1 to b6 with spaces respectively corresponding to one commodity, are disposed in the following manner: the longitudinally contacting surfaces of the commodities are shifted respectively by the length L1 to the longitudinally contacting surfaces of the commodities of the adjacent row. Namely, as shown in FIG. 4(a), the contacting surfaces of the commodities in each longitudinal row do not lie flush in the same plane as the contacting surfaces of the commodities in the next row of commodities, and are located at the side of the commodity in the next row.

The conveyor A is driven to convey the commodities at random. The commodity P1 at the forefront is stopped by the stopper 1 provided at the end of the conveyor A. Thus, the following three commodities P2, P3 and P4 are also stopped behind the first commodity P1 at the side of the operation table 2.

Figure 4B:
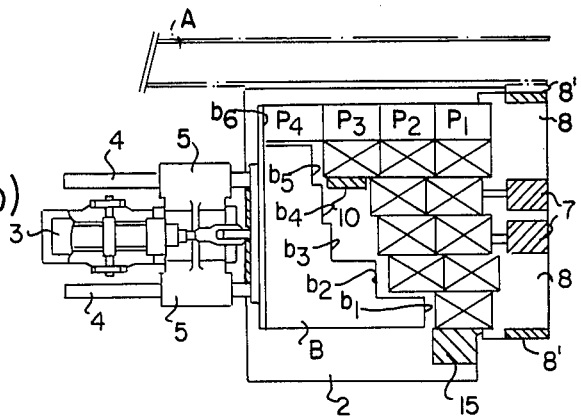

Next, the commodities P1, P2 P3 and P4 are pushed aside, as shown in FIG. 4(b), into the pusher B by a pusher or the like (not shown). The last commodity P4 enters in the rear end stage b6, and the commodities P3, P2 and P1 are longitudinally aligned in one row in front of the commodity P4. Further, because of the sideway movement of the commodities P3, P2 and P1, the commodities which have been previously set in front of the pusher B are transversely or laterally (downwardly in the Figure) moved one by one. As a result, the commodity at the right end (or the lowermost in the Figure) in the first row comes into the forefront stage b1 of the pusher B, and the commodity at the right end in the second row enters the second stage b2. Thus, the commodities respectively enter the vacant portions or spaces in front of the stages.

In this case, since the stopper 10 is provided at the left siide of the stage b4 of the pusher B, the commodities do not enter into the stages b3 or b4, as shown in FIG. 4(b).

The commodity pushed into the forefront stage b1 is stopped by the stopper 15 and is not transversely moved further in front of the stage b1.

Meanwhile, the commodities P1-P3 which are pushed to the front of the stage b6 in a straight line are positioned beside the commodities which are transversely moved to the front of the stage b5. In this position, the contacting surfaces of the longitudinally adjacent commodities temporarily agree with the contacting surfaces of other commodities.

During the above operations, the two storage bases 8 at the left and the right are raised to the same level as the operation table 2 by the cylinder 9.

Figure 4C:
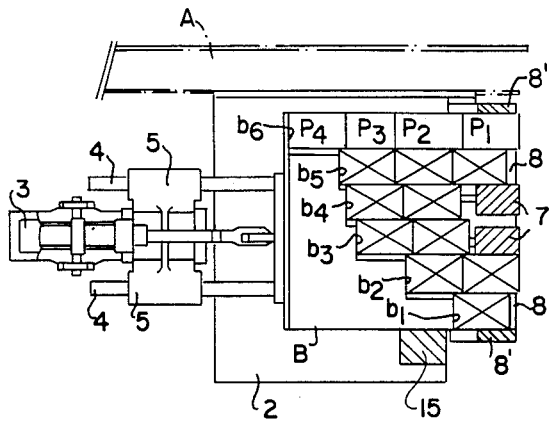
Figure 4D:
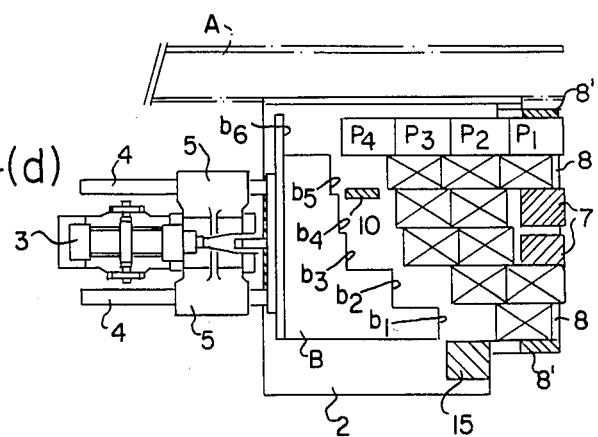
Figure 5:
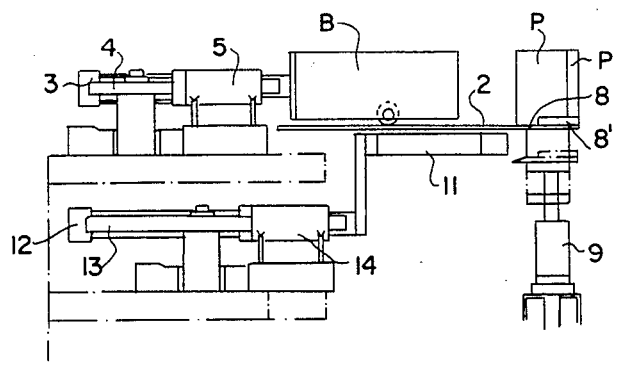
FIG. 5 is a vertical view corresponding to an elevational view of FIG. 4(d)

When the commodities P1, P2, P3 and P4 are pushed into the pusher B, as shown in FIG. 4(c), the pusher B advances the length L, which is the same length as the commodity. The commodities in the forefront or the first row including the commodity P1 are pushed onto the storage bases 8, which have been raised to the same level as the operation table 2, except for the commodities behind the two stoppers 7. Therefore, as shown in FIG. 4(d), two commodities at both ends of the first row are collected on the storage bases 8.

As seen in FIG. 4(b), the contacting surfaces of the commodities (specifically, the rear surfaces of the commodities P1, P2 and P3 and the front surfaces of the commodities P2, P3 and P4, which are in contact with one another, respectively) which are positioned in front of the stage b5 temporarily agree with the contacting surfaces of the commodities which are positioned in front of the stages b6, but the surfaces in these rows are shifted by the operation of the pusher B as shown in FIG. 4(c). When the pusher B is operated, other commodities in front of the pusher B are forwarded a length equal to the length of the commodity while maintaining such a condition such that the contacting surfaces of the longitudinally adjacent commodities shift in forward or rearward directions with each other.

Therefore, the collecting operation can be performed without problems such as the corners of the commodities irregularly catching on adjacent commodities and crashing into each other and thus, disrupting the row of commodities.

In the above embodiment, the pusher B is designed such that the commodities in front of the second stage and the following stages b3 to b6 are not closely placed to these stages but transversely shifted the length L2 as shown in FIG. 3. According to this structure, there is less likelihood that the commodities will be irregularly caught by the stages operating the pusher B.

Since the guide plates 8' are provided vertically outside of the storage bases 8, two commodities on the operation stage 2 are smoothly pushed by the pusher B into the space between the guide plate 8' and the stopper 7.

Figure 6:
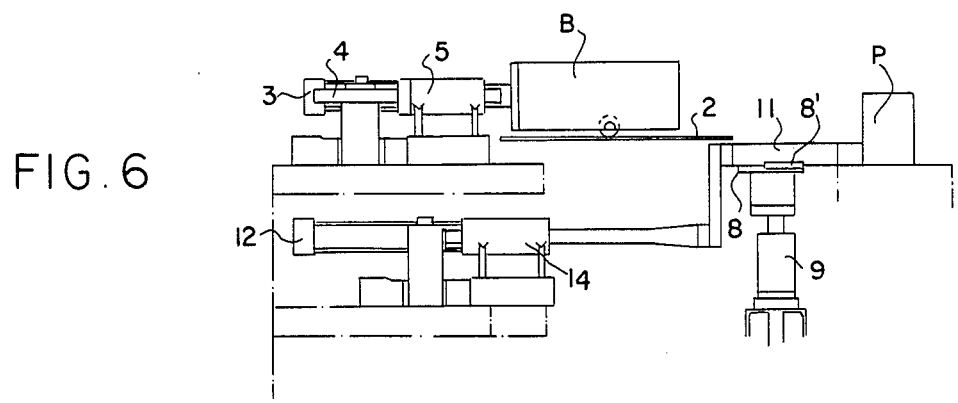
FIG. 6 is a vertical view of a pusher which is positioned under an operation table and operates from a position in FIG. 5.

As soon as the two commodities are collected on each storage base 8, the cylinder 9 lowers the two storage bases 8 to a position shown by an alternate long and short dashed line. Then, the cylinder 12 forwards the pusher 11 situated under the operation table 2 the position shown by a solid line in FIG. 6, so that the two commodities are pushed out from each storage base 8.

Figure 7:
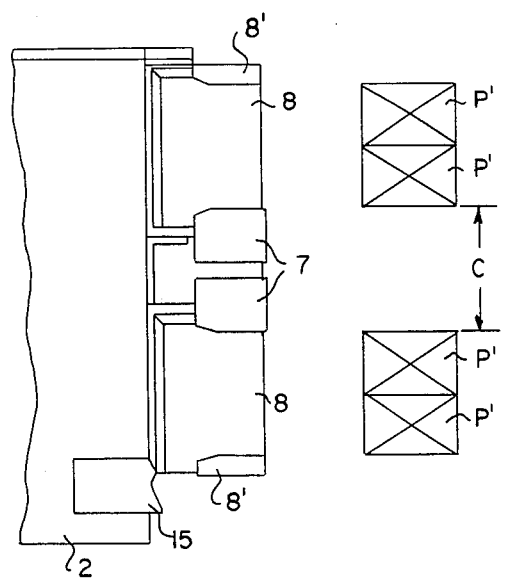
FIG. 7 is an enlarged plan view illustrating an aligned condition of the collected commodities.

Although, the two commodities respectively placed on the left and right sides on the storage bases 8 do not lay flush on the same plane by the length L1, the positions thereof in the longitudinal direction can exactly agree with the others as shown in P' in FIG. 7 when they are pushed out by the pusher 11 to the storage base 8.

This operation is repeated to collect two commodities in each group divided and spaced with the distance of two stoppers 7 on the left and the right of the stoppers 7.

The number of the commodities in each group and the space (C in FIG. 7) between the groups can be easily changed by appropriately varying the number of the stages in the pusher B, the number of the commodities pushed into it, and the number of the pushers, and the space between the stopper 7 and the guide plate 8'.

Figure 8:
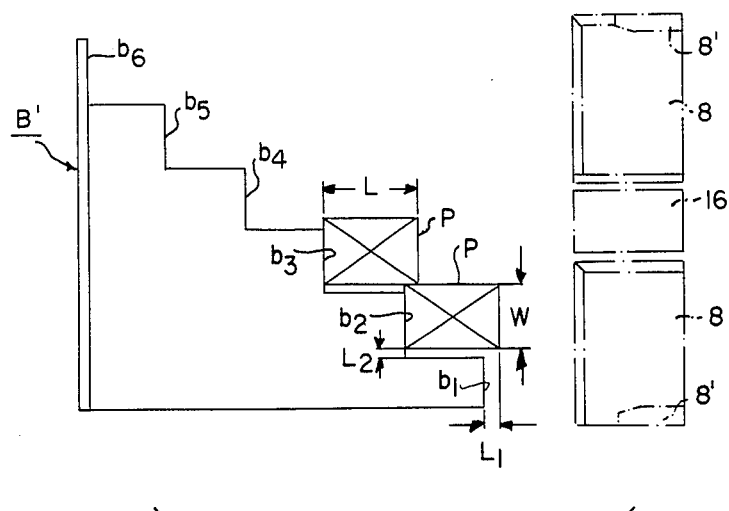
FIG. 8 is an enlarged plan view illustrating another embodiment of a pusher.

FIG. 8 illustrates another embodiment of the pusher. This pusher is provided with continuous stages of the same size. More specifically, the second to sixth stages b2 to b6 have the same size and the first stage b1 has a width smaller than the other stages by the length L2. Thus, the pusher in FIG. 8 is different from the pusher shown in FIG. 1. The longitudinal length of each of the second to sixth stages b2 to b6 is the same as those of the second and third stages b2 and b3 of the pusher shown in FIG. 1, that is, it is shorter by the length L1 than the length L of the commodity. The width of each of the stages b2 to b6 is the same as those of the second and third stages b2 and b3 of the pusher shown in FIG. 1, that is, it is the same as the width of the commodity P. The first stage b1 has a width which is shorter by L2 than the width W of the commodity P, similar to the pusher shown in FIG. 1.

By means of a device provided with the pusher B shown in FIG. 8 instead of the pusher in FIG. 1, and an enlarged operation table 2, on which longitudinally six commodities at most can be placed, being provided in front of the stage b6 of the pusher B', the commodities can be collected into groups of six on the storage bases 8, and on another base (indicated at 16 in FIG. 8) provided therebetween. In this case, neither stoppers 7 nor stopper 10 are employed.

When using the pusher B' shown in FIG. 8, similarly to the case using the pusher B shown in FIG. 1, if the pusher is operated, the commodities in front of it are forwarded a distance equal to one commodity while maintaining the condition in which the contacting surfaces of the commodities in the longitudinal direction disagree with the others. Therefore, like the case using the pusher B shown in FIG. 1, when the pusher is forwarded, the corners of the commodities are not caught by the adjacent commodities to crash into the square commodities or disorder the row and thus, the collecting operation can be performed smoothly.

As stated hereinbefore, according to the method of the present invention, the groups of commodities in rows, wherein the commodities are adjacent longitudinally to each other, are fed set by set into the tapered pusher on which stages large enough in size to accommodate the square commodities are continuously formed, and the pusher is forwarded a distance corresponding to the length of one commodity in accordance with each above operation. In the above process, one or more commodities in front of the pusher do not crash and the rows of commodities are not disrupted. Therefore, the collecting operation is not hindered. Further, according to the device of the present invention, the collecting operation of the commodities can be performed automatically and efficiently.

What is claimed is:

1. A device for collecting commodities characterized by a tapered pusher on which a plurality of stages are formed, each stage having a longitudinal length shorter than the length of a box-like commodity, a first stage of said plurality of stages having a lateral length smaller than the width of the box-like commodity and the remaining of said plurality of stages having a lateral length substantially the same as the width of the box-like commodity, said pusher being disposed on an operation table provided at a side of a conveyor for conveying the box-like commodities and is slidable in a longitudinal direction parallel to the conveyer.

* * * * *